Dec. 15, 1931.   A. E. SCHEIN   1,836,730
BEARINGS AND OILING SYSTEM FOR GYRO STABILIZERS
Filed July 27, 1922
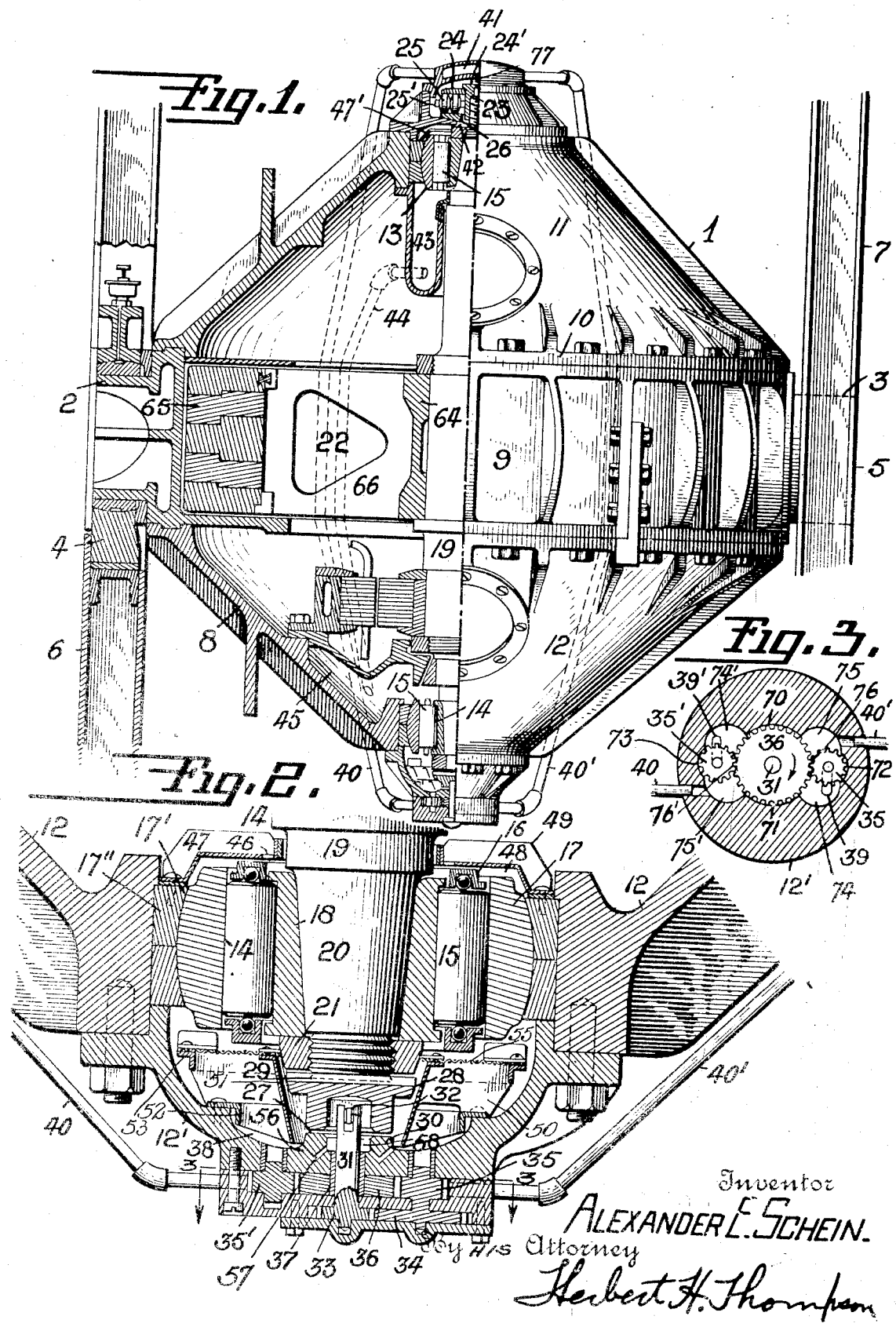
Inventor
ALEXANDER E. SCHEIN.
By his Attorney
Herbert H. Thompson Patented Dec. 15, 1931

1,836,730

UNITED STATES PATENT OFFICE

ALEXANDER E. SCHEIN, OF NEW YORK, N. Y., ASSIGNOR, BY MESNE ASSIGNMENTS, TO SPERRY GYROSCOPE COMPANY, INC., OF BROOKLYN, NEW YORK, A CORPORATION OF NEW YORK

BEARINGS AND OILING SYSTEM FOR GYRO-STABILIZERS

Application filed July 27, 1922. Serial No. 577,793.

This invention relates to bearings adapted for use in connection with heavy rotatable masses, such as fly wheels and especially gyroscopic stabilizer rotors mounted for rotation about vertical axes.

One object of the invention is to provide suitable bearings for such heavy and rapidly rotating masses.

Another object is to devise means for effectively lubricating such bearings.

Referring to the drawings wherein I have shown what I now consider to be the preferred form of my invention, Fig. 1 is a side elevation of a stabilizing gyroscope, partly in section, embodying my invention.

Fig. 2 is an enlarged sectional detail showing the lower bearings for the gyro rotor.

Fig. 3 is a sectional view taken on line 3—3 of Fig. 2.

The gyroscope 1 is shown as mounted for oscillation about a horizontal axis by means of hollow trunnions 2, 3, journaled in bearings 4, 5 supported in heavy brackets 6, 7. Said trunnions are carried by the rotor bearing casing 8, being preferably an integral part of the central annular member 9 of the casing. Bolted or otherwise secured to said central member along the flanges 10 thereof are two conical end pieces 11, 12 in which the upper and lower bearings 13, 14 respectively are mounted. The gyro rotor is shown as comprising a rim 65, spokes 66 and a hub 64 mounted on a shaft 19. Said bearings 13, 14 are in this instance shown as roller bearings, having rollers 15 held in proper position between the outer and inner races 17, 18 by a guide cage 16. Said outer race may have its outside surface spherically shaped as indicated at 17', and may fit snugly into correspondingly shaped annular members 17'' carried by the conical end piece 12. This will permit the bearing to properly align itself with the shaft. The inner race may be forced on the tapered end 20 of the rotor shaft 19 and held in place by a nut 21. The construction of the upper radial bearing 13 may of course be similar to that of the lower bearing 14.

In order to support the vertical shaft of the heavy rotor 22 I prefer to place the thrust bearing 23 at the upper end of the shaft so that the shaft and rotor will be suspended therefrom. This bearing may also be of the roller type, comprising rollers 25; a flange 24 acting as the upper race, and a lower race 26. Said flange 24 may be secured by means of a member 24' screwed upon the upper end of the shaft, while the lower race 26 may be supported by the conical end piece 11. A cage 25' may serve to hold the rollers 25 in position.

In case the upper supporting bearing should fail, I prefer to provide an auxiliary thrust bearing adjacent the lower end of the shaft. This bearing may comprise an upper bearing element 28, keyed or otherwise attached as indicated at 29 to the shaft 19 to rotate therewith, and a lower bearing element 30 which may be an integral part of the lower portion 12' of the conical end piece 12. The bearing surfaces of said elements are normally out of engagement as shown at 27.

For causing circulation of oil through the bearings, a pump preferably driven by the gyroscope itself may be provided. Said pump is shown here in the form of a double gear pump driven by means of a shaft 31, bifurcated at its upper end to straddle a pin 32 fixed in the bearing element 28 as shown. The lower end of said shaft may be provided with a pinion 33 meshing with a gear 34 on the shaft of which is a pinion 35 forming a portion of the gear pump. Pinion 35 meshes with a gear 36 journaled on a sleeve 37 surrounding shaft 31, said gear in turn meshing with a second pinion 35' similar to pinion 35. Oil from the reservoir 38 below the lower bearings flows into the pinions 35, 35' through central channels 39 and is pumped by said pinions and gear 36 through pipes 40, 40' to a top chamber 41 in the gyro casing. The action of the gears as a pump, while not new is indicated in Fig. 3.

The intermeshing gears 35, 35' and 36 may fit closely to the walls of their enclosing member 12' as shown at 70, 71, 72 and 73, so as to form chambers 74, 74' and 75, 75'. Presuming the gears to be rotating in the directions indicated by the arrows, and the oil to be flowing downwardly through channels 39, 39' into chamber 74, 74', the spaces between the gear teeth will be filled with oil which will be carried between the gears and their adjacent walls at 70, 71, 72, 73 from chambers 74, 74' into chambers 75, 75'. As the gears are intermeshed at points 76, 76' and the spaces between the teeth thus filled, it will be seen that the oil cannot be carried back again to chambers 39, 39', and is forced through the pipes 40, 40' as heretofore stated to the upper chamber 41.

From chamber 41 the oil descends by gravity through an opening 77, then through the thrust bearing 23, whence it passes through a small passageway 42 and through the radial rotor bearing 13, thence into chamber 43 thereunder from where it is led by pipe 44 to a chamber 45 above the lower radial bearing 14. The oil then flows through small openings 46 in a hood or cover plate 47 and into and through said lower bearing. A plate 47' similar to plate 47 may be provided for the upper bearing 13.

Previously in roller bearings of this type, it was found that although the bearing be supplied with plenty of oil, it would when the rotor was revolving at high speed, run dry without apparent reason. After an exhaustive investigation, I found that the reason for this action was that the roller bearings revolving at high speed would throw off the oil, in fact, the rotating cage of the bearing seemed to act as a centrifugal pump. The hydraulic head attained due to the velocity of the particles was greater than that due to gravity. Thus the cage and the races would throw off the oil so that it could not flow down through the bearing. I have discovered however, that by providing a hood or protector 47 fitting closely over the top of the bearing, to establish a small chamber 48, the oil flowing in through the openings 46 near the shaft 19 will be thrown to the outer part of chamber 48, filling the same. The oil backing up in chamber 48 will then be forced by the aforesaid centrifugal action downwardly through the bearing with positive pressure.

The plate 47 may be provided with radial ribs 49 to prevent churning of the oil.

From the bearing 14 the oil passes downwardly into the aforesaid chamber 38. This chamber may be provided with radially extending baffle plates 50 to lessen churning of the oil. The plates 50 are secured to a central conical thimble 51 surrounding the lower end of the shaft 19 and extend between annular members 52 and 53. Preferably a wire mesh 55 or other straining device is placed below the bearing to prevent solid particles from entering the pumps. Thimble 51 serves to prevent the oil from coming in contact with the rotating parts near the lower end of the bearing which would subject it to rotational velocity. Oil is supplied to the auxiliary thrust bearing 27 through channels 56, 57 and chamber 58. The oil from chamber 58 also serves to lubricate the bearing of shaft 31.

In operation it will be recognized that the oil will be circulated at a rate proportionate to the speed at which the rotor operates as the pump gears 35, 35', 36 are actuated directly by the rotor and as the rotating elements of the bearings 14, 15 subject the oil to pressure which forces it through the bearings and this pressure is proportionate to the speed of the rotating elements.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is, 1. The combination with a vertical roller bearing of means whereby oil is fed into the top thereof solely by gravity, and a hood adjacent and above the bearing to prevent the throwing off of the oil and to cause a building up of pressure above the bearing.

2. The combination with a vertical roller bearing, of means whereby oil is fed into the top thereof solely by gravity, a hood adjacent and above the bearing to prevent the throwing off of the oil, and baffle plates below the bearing to stop swirling of the oil.

3. The combination with a mass adapted to be rotated about a substantially vertical axis, of a shaft on which said mass is mounted, an upper thrust bearing for the shaft, an upper and a lower radical bearing, and a lower auxiliary thrust bearing adapted to support the weight of the shaft and mass in case the upper thrust bearing ceases to function.

4. In combination with a rotatable shaft, radial bearings therefor, a normally operative thrust bearing for said shaft adjacent one end thereof and a normally inoperative thrust bearing for said shaft adjacent the other end thereof, said normally inoperative bearing adapted to become operative when said normally operative bearing ceases to function.

5. In combination with a shaft adapted to rotate about a vertical axis, a radial bearing for said shaft, means whereby said shaft is rotated sufficiently rapidly to tend to throw the oil from said bearing outwardly, a hood cooperating with said bearing to form a restricted chamber thereabove, a source of oil supply, said hood having an oil inlet near the inner part of said bearing where it is least affected by the said centrifugal action of said shaft for feeding said oil into said bearing solely by gravity.

6. In combination, a gyroscopic rotor adapted for rotation about a substantially vertical axis, upper and lower radial bearings for said rotor, a supporting thrust bearing for said rotor, an auxiliary normally inoperative supporting thrust bearing therefor, said thrust bearings being positioned adjacent opposite ends of said shaft, and means including said rotor for supplying oil to said bearings.

7. The combination with a vertical roller bearing in which oil is normally thrown off by centrifugal action so as to tend to prevent feeding of oil therethrough, of means for feeding oil into said bearing by gravity, and a stationary hood over the top of said bearing for preventing said centrifugal action from forcing oil against gravity and for assisting gravity in feeding oil through said bearing.

8. The combination with a vertical shaft, of a roller bearing therefor in which oil is normally thrown off by centrifugal action so as to tend to prevent feeding of oil therethrough, and a hood over said bearing for causing said centrifugal action to assist gravity in feeding oil through said bearing at a rate proportional to the speed of rotation of said shaft.

9. In combination with a shaft adapted to rotate about a vertical axis, a radial bearing for said shaft, means whereby said shaft is rotated sufficiently rapidly to tend to throw the oil from said bearing outwardly, a hood secured to a fixed part and cooperating with said bearing to form a restricted chamber thereabove, a source of oil supply, said hood having an oil inlet near the inner part of said bearing where it is least affected by the said centrifugal action of said shaft for feeding said oil into said bearing solely by gravity, and means on the upper surface of said hood for preventing swirling of the oil.

10. The combination with a vertical roller bearing in which oil is normally thrown off by centrifugal action so as to tend to prevent feeding of oil therethrough, of means for feeding oil into said bearing by gravity, a stationary hood over the top of said bearing for preventing said centrifugal action from forcing oil against gravity and for assisting gravity in feeding oil through said bearing, an upwardly extending flange around the inner periphery of said hood, and baffles on the upper surface thereof whereby swirling of the oil above said hood is prevented.

In testimony whereof I have affixed my signature.

ALEXANDER E. SCHEIN.